United States Patent Office 3,232,915
Patented Feb. 1, 1966

3,232,915
SUSPENSION POLYMERIZATION USING 2-STAGE BUFFER SALT ADDITION TO PREVENT CLUSTERING AND TO REGULATE BEAD SIZE
John Lorymer Bush, Orange, Tex., and Thomas Newton Shipley, Vienna, W. Va., assignors to E. I. du Pont de Nemours and Company, Wilmington, Del., a corporation of Delaware
No Drawing. Filed May 2, 1962, Ser. No. 192,011
5 Claims. (Cl. 260—89.5)

This invention relates to the production of polymers of methyl methacrylate and the like, by suspension polymerization.

Suspension polymerization is a well known process, and is known to be useful in methyl methacrylate polymerization as demonstrated for example, by U.S. Patents 2,383,069 and 2,565,141.

The processes of the prior art produce polymer particles of various sizes, but means known by the art to regulate the particle size are inadequate. Particle size is of major significance in determining the end use of the bead polymer. Particles of very small size are highly desirable when the particles are to be dissolved in solution to form a base for paint. Larger particles are highly desirable if the polymer is to be extruded because beads slip under the extruder screw.

Various anticlustering agents such as sodium hypophosphite have been added to the aqueous mixture to keep the resin particles from agglomerating when they are in the tacky stage. (See U.S. Patent 2,565,141.) These anticlustering agents are not easily removed from the polymer after polymerization, and particular ones cause severe discoloration of the polymer when the polymer is subjected to heat during molding or while the molded article is in use.

It is, therefore, the object of the present invention to provide a process for the production of methyl methacrylate polymers and copolymer in which the size of the beads can be accurately regulated, and in which the beads are kept in suspension without resort to an agent at a concentration that adversely affects the properties of the final polymer. A further object of the invention is to obtain a process such that the bead particles are of more uniform size.

It has been found that the size of the individual beads of polymer in the final product is determined almost entirely during the initial period of polymerization when the beads are largely unpolymerized monomer. When the beads become about 40% polymerized, the particle size is fixed, and when beads collide and separate the individual bead is still distinguishable. There is no longer a total mixture of material when the beads collide.

It has been further determined that the particle size is dependent on the concentration of buffer in the aqueous phase of the suspension during the initial stage of polymerization, and particle size varies directly with said concentration—that is, as the concentration of the buffer is increased, the size of the particles increase. It has further been determined that the tendency of the particles to form clusters after they reach the stage of polymerization where there is no longer a total exchange of material when two particles collide, is dependent also upon the concentration of the buffer, and varies inversely with the concentration of the buffer—that is, if the concentration of the buffer is low, the tendency of the particles to form clusters is high, whereas if the concentration of the buffer is high the tendency of the particles to cluster is low. Thus at a given concentration of buffer it is not possible to insure small beads that are not clustered.

In order to overcome the above difficulties and realize the above objects, it has been determined that the concentration of buffer in the aqueous phase of the suspension should be selected to give the desired particle size; the polymerization reaction should then be carried out until the monomer phase is about 40% polymerized. At this stage in the polymerization the individual spheres of monomer-polymer which form the non-aqueous phase are still sufficiently tacky that they agglomerate if they come in contact with each other, but there is not a total mixture of materials when they do agglomerate. The amount of buffer in the aqueous phase is then increased and the polymerization reaction carried to completion. The amount of buffer initially added should be within the range of 1.5 to 8.8 parts per thousand parts of water and preferably 2.7 to 6.6 parts per thousand parts of water and the amount of buffer added when the polymerization is about 40% complete is between ⅓ and 3 times the amount initially added. The amount of monomer that may be polymerized in the buffer solution without excessive agglomeration is of the order of a .55 to 1.5 ratio of monomer phase to aqueous phase, preferably about .65 to 1.

Although the theory of two stage addition of buffer salt to the aqueous phase is not entirely understood, it is perhaps explainable at least in part on the basis that methacrylic acid is liberated during the polymerization through slow hydrolysis of the methyl methacrylate monomer; and the high buffer salt concentration required in the final stages of polymerization to keep the tacky particles from clustering is merely maintaining the pH at such a level that granulating agents such as polymethacrylic acid can effectively work.

Suitable buffers for use in the process include: disodium phosphate, dipotassium phosphate, diammonium phosphate, alkali metal borates, alkali metal tartrates.

In the following examples which illustrate the invention, all parts are in parts by weight unless otherwise stated.

As shown in the following table, this example actually consists of a group of runs under substantially identical conditions, the only variable being the amount of buffer salt added, and the time at which the salt was added. Into a reactor equipped with an agitator the following materials were added:

| | Parts |
|---|---|
| Methyl methacrylate | 14,000 |
| Ethyl acrylate | 350 |
| n-Dodecyl mercaptan | 51 |
| Water | 18,000 |
| Disodium phosphate | [1] 50 to 200 |
| Sodium hypophosphite | 20 |
| Polymethacrylic acid (1% aqueous solution) | 350 |
| α,α'-azobisisobutyronitrile | 17 |
| Second salt addition, disodium phosphate | 0 to 200 |

[1] As shown in table.

A salt solution, prepared by dissolving 600 grams $Na_2HPO_4$ in 2 liters of water, was used for the second salt addition. The solution had a density of 1.232 grams/cc., and 180 cc. of solution contains 50 grams of $Na_2HPO_4$.

The initial kettle charge was heated to about 105° C., and then held at this temperature. The second salt addition, if used, was made after 20 to 35 minutes at 105° C. A temperature peak of 112 to 113° C. was obtained after 40 to 50 minutes at 105° C.

The results obtained are given in the following table:

| Example | Amount of buffer salt initially added in grams | Amount of buffer salt added in 2nd stage | Temperature in degrees C. | | Product appearance | Screen analysis of product in percent by weight on mesh of stated size | | | | | |
|---|---|---|---|---|---|---|---|---|---|---|---|
| | | | Ave. | Peak | | 20 | 40 | 60 | 80 | 100 | Pan |
| I | 50 | None | 105 | 112.5 | Particles are fine but many small clusters. | .35 | .8 | 5.00 | 34.05 | 18.00 | 41.80 |
| II | 100 | None | 105 | 112.5 | Particles are unclustered and large. | .35 | 1.20 | 48.40 | 39.15 | 3.10 | 7.80 |
| III | 50 | 50 | 105 | 112 | Particles are fine and unclustered. | .05 | .55 | 8.25 | 36.65 | 31.45 | 23.05 |
| IV | 200 | None | 105 | 113 | Particles are large and unclustered. | .94 | 14.78 | 59.18 | 22.32 | 2.39 | .40 |
| V | 200 | 200 | 105 | 112 | do | 1.04 | 16.32 | 60.39 | 18.71 | 2.04 | 1.60 |
| VI | 75 | 125 | 105 | 113 | Particles are small and unclustered. | .04 | 1.15 | 2.16 | 33.98 | 43.66 | 19.01 |
| VII | 75 | None | 105 | 112 | Particles are small but many small clusters. | 1.33 | 1.66 | 37.19 | 36.20 | 7.32 | 16.30 |

In Examples VIII and IX the components of the system were as follows:

| | Ex. VIII | Ex. IX |
|---|---|---|
| | Parts | Parts |
| Initial kettle charge: | | |
| Methyl methacrylate | 12,180 | 12,180 |
| Ethyl acrylate | 1,820 | 1,820 |
| n-Dodecyl mercaptan | 44 | 44 |
| $\alpha,\alpha'$-azobisisobutyronitrile | 28 | 28 |
| Water | 18,500 | 18,500 |
| Disodium phosphate | 0 | 95 |
| Monosodium phosphate | 15 | 15 |
| Sodium hypophosphite | 60 | 120 |
| Polymethacrylic acid (1% solution in water) | 250 | 600 |
| Second salt addition: | | |
| Water | 400 | 0 |
| Disodium phosphate | 90 | 0 |
| Sodium hypophosphite | 60 | 0 |

The initial charge was heated in an agitated vessel to 95° C. and was held at that temperature. After ten minutes at 95°, the second salt addition was made. About eighteen minutes later, a temperature peak of 99° C. was reached. Ten minutes later, the batch was cooled.

| Screen analysis, weight percent retained on screen of mesh | Ex. VIII | Ex. IX |
|---|---|---|
| 20 | 0 | 0.7 |
| 40 | 0 | 60.3 |
| 60 | 0.1 | 35.2 |
| 80 | 6.1 | 1.5 |
| 100 | 16.1 | 0.2 |
| 140 | 47.4 | Trace |
| 160 | 19.1 | 0 |
| Pan | 11.1 | 0 |

The invention is not limited to polymerization of methyl methacrylate as the major component of the polymer, and is equally applicable to suspension polymerization processes in which styrene, vinyl acetate, vinyl chloride, and other suitable vinyl monomers are used as well as copolymers of these compounds.

It is clear from the above examples that the amount of buffer initially in the suspension has a definite effect upon the size of the particles. It is further clear that the amount of unclustered polymer that may be obtained from a single batch may be varied by the addition of the buffer in two stages. It is still further clear that a more uniform particle size may be obtained by proper regulation of the amount of buffer and amount of monomer.

The above examples are of course merely illustrative of the invention and many different embodiments will be apparent to one skilled in the art that are within the scope of the invention as defined by the following claims.

We claim:
1. A process for the production of polymer comprising methyl methacrylate units by suspension polymerization in which the polymer bead size is regulated and in which the tendency of the polymer beads to cluster is inhibited which comprises:
   (a) forming an aqueous suspension of a monomer to be polymerized in an aqueous solution having a predetermined buffer salt concentration within the range of 1.5 to 8.8 parts per thousand parts of water, the ratio of monomer to aqueous solution being of the order of .55 to 1.5;
   (b) polymerizing said monomer until the polymer-monomer beads reach the tacky stage at which there is no longer a total exchange of material when polymer-monomer particles collide with each other;
   (c) and then adding additional buffer salt to the aqueous suspension, the amount of said addition being from ⅓ to 3 times the amount of buffer salt initially added;
   (d) continuing the polymerization reaction until the reaction is complete and recovering unclustered polymer beads.

2. The process of claim 1 in which the buffer salt is selected from the group consisting of disodium phosphate, dipotassium phosphate, and diammonium phosphate.

3. In a process for the production of polymer comprising methyl methacrylate units, in which the reaction is carried out in an aqueous suspension comprising a monomer phase and aqueous phase, the ratio of monomer phase to aqueous phase being of the order of .55 to 1.5, and in which the aqueous phase initially contains the polymerization catalyst and a buffer salt selected from the class consisting of disodium phosphate, dipotassium phosphate, and diammonium phosphate, the improvement which comprises:
   (a) polymerizing said monomer phase until the reaction is approximately 40% complete in an aqueous solution containing 1.5 to 8.8 parts buffer salt per thousand parts of water;
   (b) adding from ⅓ to three times the amount of buffer salt initially present to the aqueous solution;

(c) continuing the polymerization until the reaction is completed, and then recovering the product.

4. The process of claim 3 in which the buffer salt is disodium phosphate.

5. The process of claim 3 in which the polymerization reaction is initiated in an aqueous solution containing 2.7 to 6.6 parts buffer per thousand parts of water.

References Cited by the Examiner

UNITED STATES PATENTS

| 2,122,886 | 7/1938 | Marks | 260—89.5 |
| 2,715,118 | 8/1955 | Grim | 260—89.5 |

JOSEPH L. SCHOFER, *Primary Examiner.*

J. R. LIBERMAN, LEON J. BERCOVITZ, *Examiners.*